(12) United States Patent
Depta et al.

(10) Patent No.: US 11,673,669 B2
(45) Date of Patent: Jun. 13, 2023

(54) INTERIOR AIRCRAFT LIGHT, AIRCRAFT CABIN LIGHTING SYSTEM, AIRCRAFT, AND METHOD OF ILLUMINATING AN AIRCRAFT CABIN

(71) Applicant: Goodrich Lighting Systems GmbH, Lippstadt (DE)

(72) Inventors: Marion Depta, Lippstadt (DE); Andreas Ueberschaer, Guetersloh (DE); Andre Hessling-Von Heimendahl, Koblenz (DE); Björn Schallenberg, Geseke (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 555 days.

(21) Appl. No.: 16/713,408

(22) Filed: Dec. 13, 2019

(65) Prior Publication Data
US 2020/0361608 A1  Nov. 19, 2020

(30) Foreign Application Priority Data
May 17, 2019  (EP) .................................. 19175029

(51) Int. Cl.
| | | |
|---|---|---|
| B64D 11/00 | (2006.01) | |
| B60Q 3/50 | (2017.01) | |
| B60Q 3/47 | (2017.01) | |
| B60Q 3/68 | (2017.01) | |
| B60Q 3/43 | (2017.01) | |
| F21V 9/30 | (2018.01) | |
| F21V 7/00 | (2006.01) | |
| F21Y 115/10 | (2016.01) | |

(52) U.S. Cl.
CPC ................ *B64D 11/00* (2013.01); *B60Q 3/43* (2017.02); *B60Q 3/47* (2017.02); *B60Q 3/50* (2017.02); *B60Q 3/68* (2017.02); *F21V 7/00* (2013.01); *F21V 9/30* (2018.02); *B64D 2011/0038* (2013.01); *B64D 2203/00* (2013.01); *F21Y 2115/10* (2016.08)

(58) Field of Classification Search
CPC ............ B64D 11/00; B64D 2011/0038; B64D 2203/00; B60Q 3/50; B60Q 3/47; B60Q 3/68; B60Q 3/43; F21V 9/30; F21V 7/00; F21Y 2115/10
USPC ........................................................ 362/471
See application file for complete search history.

(56) References Cited

U.S. PATENT DOCUMENTS

| | | |
|---|---|---|
| 9,409,515 B2 | 8/2016 | Salter et al. |
| 9,539,939 B2 | 1/2017 | Salter et al. |

(Continued)

FOREIGN PATENT DOCUMENTS

| | | |
|---|---|---|
| DE | 102008008153 A1 | 8/2009 |
| EP | 3305659 A1 | 4/2018 |

OTHER PUBLICATIONS

European Search Report for Application No. 19175029.8, dated Nov. 15, 2019, 8 pages.

*Primary Examiner* — Britt D Hanley
*Assistant Examiner* — Hana S Featherly
(74) *Attorney, Agent, or Firm* — Cantor Colburn LLP (57) ABSTRACT

An interior aircraft light includes a mounting structure for mounting the interior aircraft light to an aircraft seat; a UV radiation source; and an optical system, configured to direct UV radiation from the UV radiation source towards a floor portion underneath the aircraft seat.

12 Claims, 5 Drawing Sheets

(56) References Cited

U.S. PATENT DOCUMENTS

| | | |
|---|---|---|
| 2004/0090787 A1* | 5/2004 | Dowling ................ H05B 47/18 |
| | | 362/479 |
| 2008/0106702 A1 | 5/2008 | Huonker |
| 2014/0009274 A1 | 1/2014 | Kohlmeier-Beckmann et al. |
| 2015/0138820 A1 | 5/2015 | Salter et al. |
| 2018/0099763 A1 | 4/2018 | Hills |

* cited by examiner

INTERIOR AIRCRAFT LIGHT, AIRCRAFT CABIN LIGHTING SYSTEM, AIRCRAFT, AND METHOD OF ILLUMINATING AN AIRCRAFT CABIN

FOREIGN PRIORITY

This application claims priority to European Patent Application No. 19175029.8 filed May 17, 2019, the entire contents of which is incorporated herein by reference.

TECHNICAL FIELD

The present invention is in the field of interior aircraft lighting. In particular, the present invention is in the field of interior aircraft lights and aircraft cabin lighting systems.

BACKGROUND

Almost all modern aircraft, in particular commercial passenger aircraft, have interior lighting. The interior light units of an aircraft serve a variety of different purposes. Cabin illumination lights are provided for a general illumination of the aircraft cabin, allowing the passengers and crew to be aware of their surroundings and to walk around the cabin. Signalling lights, such as exit sign lights, are provided for conveying information to the passengers and crew, such as safety-critical information about the positions of the emergency exits of the aircraft. Further, targeted lighting is provided for a variety of purposes. For example, reading lights allow passengers to individually adapt the illumination of their personal space.

Despite this extensive use of different kinds of interior aircraft lights, it would be beneficial to add further functionality to interior aircraft lighting systems.

SUMMARY

Exemplary embodiments of the invention include an interior aircraft light, comprising a mounting structure for mounting the interior aircraft light to an aircraft seat; a UV radiation source; and an optical system, configured to direct UV radiation from the UV radiation source towards a floor portion underneath the aircraft seat.

Exemplary embodiments of the invention allow for an efficient provision of UV radiation, i.e. ultraviolet radiation, underneath the aircraft seat. With the mounting structure being configured for mounting the interior aircraft light to the aircraft seat, the distance from the interior aircraft light to the floor portion underneath the aircraft seat may be kept small. With said distance being small, as compared to previous approaches of providing UV radiation sources in a ceiling region of an aircraft cabin, the provision of UV radiation may be achieved with higher efficiency. Also, a more targeted provision of UV radiation to particular locations of the floor portion underneath the aircraft seat may be achieved. A particularly efficient and/or a particularly targeted provision of UV radiation underneath the aircraft seat may allow for an efficient use of indirect lighting in the form of photoluminescent elements. A high degree of freedom for placing and shaping such photoluminescent elements underneath the aircraft seat may be achieved. For example, aisle guidance elements and/or illumination elements may be efficiently excited by the UV radiation source. Also, a pleasant illumination of the aircraft cabin floor via such photoluminescent elements may be achieved. Further, the UV radiation is non-visible and is little or not disturbing to the passengers in night-time and/or twilight conditions. Photoluminescent elements may be chosen to provide a desired level of attraction to passengers under scotopic/mesopic conditions. Depending on the photoluminescent material of the photoluminescent elements, i.e. depending on the wavelength of the light emission by the photoluminescent material, and depending on the extensions of the photoluminescent elements, a good compromise between providing signalling information and/or other illumination during flights in night-time and/or twilight conditions and keeping the disturbance of passengers low may be achieved.

The optical system is configured to direct UV radiation from the UV radiation source towards a floor portion underneath the aircraft seat. The optical system may comprise one or more lenses and/or one or more reflectors and/or one or more shutters. In general, the optical system may comprise any kind of optical element(s) suitable for affecting the path of UV radiation coming from the UV radiation source. In particular, the optical system may comprise one or more refractive elements and/or one or more reflective elements. The terminology of the optical system directing UV radiation from the UV radiation source towards the floor portion underneath the aircraft seat may refer to a substantial re-direction of the UV radiation or to a more subtle help in orienting the light output of the interior aircraft light or to a combination of substantially re-directing part of the UV radiation from the UV radiation source and affecting the path of another part of the UV radiation only slightly or passing another part of the UV radiation through without any re-direction.

According to a further embodiment, the UV radiation source is a UV LED. UV LEDs are a particularly efficient way of providing UV radiation. Further, the use of a UV LED may allow for the provision of a highly reliable interior aircraft light and/or for an interior aircraft light having particularly low space requirements. In this way, the interior aircraft light may not have a big impact on the highly spaced-constrained environment around an aircraft seat.

According to a further embodiment, the optical system comprises a reflector arranged over the UV radiation source for directing UV radiation from the UV radiation source towards the floor portion underneath the aircraft seat. The reflector may have a parabolic or spherical or other concave shape, when seen from the UV radiation source. With the optical system comprising a reflector, a well-defined and well-targeted provision of UV radiation may be achieved with a small space envelope. The optical system may, in addition or as an alternative to the reflector, comprise a lens and/or any other optical element for directing the UV radiation from the UV radiation source towards the floor portion underneath the aircraft seat.

According to a further embodiment, the interior aircraft light further comprises a transparent or translucent protective cover, arranged over the UV radiation source and the optical system. In this way, the UV radiation source and the optical system may be effectively protected from the potential hazards in the environment of an aircraft seat. For example, the UV radiation source and the optical system may be protected from passengers moving or kicking their feet, from cabin baggage being handled, from flight crew trolleys being pushed through the aisle, etc.

According to a further embodiment, the mounting structure is configured for mounting the interior aircraft light to a seat base of the aircraft seat. Aircraft seats have to satisfy strict requirements in terms of mechanical rigidity. The seat base is of an aircraft seat is a very strong mechanical structure, having high stability under various load conditions. Mounting the interior aircraft light to the seat base of the aircraft seat may allow for a very stable attachment between the interior aircraft light and the aircraft seat and may allow for a highly stable light output from the interior aircraft light over a wide range of flight conditions. The interior aircraft light may be configured for being mounted to one or more bars of the seat base, such as along a bar that acts as a bridge between different portions of the seat base, or in other configurations with respect to the bars of the seat base.

According to a further embodiment, the mounting structure is shaped complementary to the seat base of the aircraft seat. For example, the mounting structure may be shaped complementary to the geometry of two legs of an X-shaped or V-shaped portion of the seat base. In this way, the interior aircraft light may have a geometry that blends well into the seat base structure of the aircraft seat. This in turn may place the interior aircraft light at a position where its risk of being tampered with, for example by passenger feet, cabin baggage or trolleys, may be small.

According to a further embodiment, the UV radiation from the UV radiation source may be near ultraviolet radiation, i.e. ultraviolet radiation with a wavelength of between 300 nm and 400 nm. The expression of the UV radiation from the UV radiation source being near ultraviolet radiation does not mean that the UV radiation source exclusively emits light in the near ultraviolet wave length range. Rather, the UV radiation source may emit a large majority of its light output in said wavelength range. The UV radiation source may emit more than 90%, in particular more than 95%, further in particular more than 99%, of its light output in the wavelength range between 300 nm and 400 nm.

According to a further embodiment, the interior aircraft light further comprises a visible light source; and a second optical system, configured to direct visible light from the visible light source towards an aisle floor portion sideways of the aircraft seat. In this way, the interior aircraft light may both provide UV radiation directed towards a floor portion underneath the aircraft seat as well as provide visible light directed towards an aisle floor portion of the aisle of the aircraft cabin. With the interior aircraft light being mountable to the aircraft seat, the proximity to the floor portion underneath the aircraft seat and to the aisle floor portion sideways of the aircraft seat may be used for an efficient provision of UV radiation as well as visible light at the floor of the aircraft cabin. Both the UV radiation and the visible light may be provided in a particularly efficient and/or particularly targeted manner. The interior aircraft light may combine two favorable ways of providing illumination under scotopic and/or mesopic conditions. Excitation of and indirect illumination via photoluminescent elements and direct illumination of the aisle floor portion with visible light may be combined to provide sufficient visibility around the floor of the aircraft cabin, without providing disturbing levels of illumination at the passengers' eye height, when sitting in aircraft seats or walking around the aircraft cabin.

The second optical system is configured to direct visible light from the visible light source towards an aisle floor portion sideways of the aircraft seat. The second optical system may comprise one or more lenses and/or one or more reflectors and/or one or more shutters. In general, the second optical system may comprise any kind of optical element(s) suitable for affecting the path of visible light coming from the visible light source. In particular, the second optical system may comprise one or more refractive elements and/or one or more reflective elements. The terminology of the second optical system directing visible light from the visible light source towards the aisle floor portion sideways of the aircraft seat may refer to a substantial re-direction of the visible light or to a more subtle help in orienting the light output of the interior aircraft light or to a combination of substantially re-directing part of the visible light from the visible light source and affecting the path of another part of the visible light only slightly or passing another part of the visible light through without any re-direction. The term visible light source refers to a radiation source that emits visible light. It does not require the light source to be visible from the outside of the interior aircraft light. In particular, the visible light source may be not discernible from outside the interior aircraft light, e.g. due to the second optical system and/or the transparent or translucent protective cover.

According to a further embodiment, the visible light source is in the amber orange red range of the color spectrum. With such a visible light source, a particularly pleasant illumination of the aisle floor portion sideways of the aircraft seat may be achieved. The human eye is not very sensitive to amber, orange and red light under scotopic or mesopic conditions. In this way, an effective illumination of the aisle floor portion sideways of the aircraft seat may be achieved for passengers walking along the aircraft cabin, while the illumination of the aisle floor portion sideways of the aircraft seat is little or not disturbing to sleeping passengers and/or passengers trying to fall asleep. The terminology of the visible light source being in the amber orange red range of the color spectrum encompasses light sources that emit light in any one of the amber range of the color spectrum, the orange range of the color spectrum, and the red range of the color spectrum as well as light sources that emit light in two or all of those ranges of the color spectrum.

According to a further embodiment, the visible light source has its peak light intensity at a peak wavelength of between 580 nm and 650 nm, in particular at a peak wavelength of between 590 nm and 630 nm.

According to a further embodiment, the visible light source has a correlated color temperature of between 1000 K and 2500 K, in particular of between 1500 K and 2000 K.

According to a further embodiment, the visible light source is a visible light LED. The visible light LED may have a high efficiency for illuminating the aisle floor portion sideways of the aircraft seat. Further, the use of a visible light LED may allow for the provision of a highly reliable interior aircraft light and/or for an interior aircraft light having particularly low space requirements, while providing an efficient way of illuminating the aisle floor portion sideways of the aircraft seat.

According to a further embodiment, the visible light source and the second optical system are configured to provide an illumination of the aisle floor portion sideways of the aircraft seat with a ratio of maximum illuminance to minimum illuminance of between 1 and 3, in particular of between 1.5 and 2.5. In this way, a particularly even/uniform illumination of the aisle floor portion sideways of the aircraft seat may be achieved. This in turn may allow for a particularly safe environment for walking along the aircraft aisle in night time and/or twilight conditions.

According to a further embodiment, the second optical system comprises a lens arranged over the visible light source for directing visible light from the visible light source towards the aisle floor portion sideways of the aircraft seat. The lens may be a free form lens. With a lens, a good compromise between reaching a uniform illumination of the aisle floor portion sideways of the aircraft seat and a small space envelope of the second optical system may be achieved.

Exemplary embodiments of the invention further include an aircraft cabin lighting system comprising: an interior aircraft light, as described in any of the embodiment above; and a photoluminescent panel, with the photoluminescent panel in operation emitting visible light after being excited by the UV radiation of the interior aircraft light. The photoluminescent panel may be positioned at the floor portion underneath the aircraft seat or at the seat base of the aircraft seat or at any suitable position where it can be reached by UV radiation from the interior aircraft light, directed towards the floor portion underneath the aircraft seat. The photoluminescent panel may have any suitable size and shape. It may be a comparably small structure, such as a photoluminescent marking or tag. It may also be a more extended structure, such as a photoluminescent plate, in particular a photoluminescent plate arranged on the floor portion underneath the aircraft seat. The additional features, modifications, and effects, described above with respect to the interior aircraft light, apply to the aircraft cabin lighting system in an analogues manner.

According to a further embodiment, the photoluminescent panel has a row number shape. In this way, the interior aircraft light and the photoluminescent panel may provide for an effective guiding of passengers along the aircraft cabin. The row number may be easily visible to passengers walking along the aircraft aisle, while the glowing of the row number may be not or only little disturbing to passengers sleeping or resting in their seats. The photoluminescent panel may have the inherent shape of a row number. It is also possible that the photoluminescent panel has a basic geometric shape, such as a square shape or rectangular shape, with the photoluminescent material being provided across the entire basic geometric shape and with an overlying mask exposing only part of the photoluminescent material in the form of a row number. The overlaying mask may have substantially the same basic geometric shape as the basic geometric shape of the photoluminescent panel and may have the row number cut out for exposing part of the photoluminescent material in the form of a row number. The photoluminescent panel is said to have a row number shape, because the exposed portion of the photoluminescent material is in form of a row number. In this way, only one kind of photoluminescent panel can be used for equipping an entire aircraft cabin, with different masks being applied for the different row numbers.

According to a further embodiment, the photoluminescent panel is attachable to a seat base of the aircraft seat. In particular, the photoluminescent panel may have a snap-on mechanism for being attached to the seat base, in particular to a lower bar of the seat base. Also, the photoluminescent panel may be attachable to the seat base in an inclined manner towards the aisle of the aircraft cabin. In particular, the photoluminescent panel may be inclined at an acute angle with respect to the floor portion underneath the aircraft seat. With the photoluminescent panel being attached to the seat base of the aircraft seat, in particular in an inclined manner towards the aisle, the illumination/guiding via the photoluminescent panel is particularly effective for passengers walking along the aisle of the aircraft cabin.

It is pointed out that the photoluminescent panel may also be arranged on the floor beneath the aircraft seat, such as in the form of an extended structure underneath the aircraft seat. The photoluminescent panel may also be arranged as another kind of guidance element on the floor beneath the aircraft seat, such as an elongate, strip-like structure. The strip-like structure may in particular by provided at that part of the floor portion underneath the aircraft seat that is adjacent to the aisle floor portion sideways of the aircraft seat.

According to a further embodiment, the photoluminescent panel is one of a fluorescent panel and a phosphorescent panel.

Exemplary embodiments of the invention further include an aircraft seat comprising: a seat back; a seat pan; a seat base, the seat base supporting the seat back and the seat pan; and an interior aircraft light, as described in any of the embodiments above, mounted to the seat base. The additional features, modifications, and effects, described above with respect to the interior aircraft light and the aircraft cabin lighting system, apply to the aircraft seat in an analogues manner.

Exemplary embodiments of the invention further include an aircraft, comprising a plurality of aircraft seats, as described in any of the embodiments above. In particular, the aircraft may have one or two aircraft seats, as described in any of the embodiments above, per seat row of the aircraft cabin. In this way, a continuous provi sion of UV radiation underneath the aircraft seats and, potentially, of visible light along the aisle floor, may be provided in an efficient manner. The aircraft seats equipped with interior aircraft lights, as described herein, may be aisle seats towards one or both sides of the aisle of the aircraft cabin. The additional features, modifications, and effects, described above with respect to the interior aircraft light and the aircraft cabin lighting system, apply to the aircraft in an analogues manner.

Exemplary embodiments of the invention further include an aircraft, comprising a plurality of aircraft cabin lighting systems, as described in any of the embodiments above. The additional features, modifications, and effects, described above with respect to the interior aircraft light and the aircraft cabin lighting system, apply to the aircraft in an analogues manner. The aircraft cabin lighting systems may be installed in the aircraft seats to the left and/or to the right of the aisle of the aircraft cabin.

According to a further embodiment, the aircraft is an air plane, in particular a large commercial passenger air plane, or a helicopter.

Exemplary embodiments of the invention further include a method of lighting an aircraft cabin, the method comprising emitting UV radiation towards a floor portion underneath an aircraft seat from an interior aircraft light mounted to the aircraft seat. The additional features, modifications, and effects, as described above with respect to the interior aircraft light and the aircraft cabin lighting system, apply to the method of lighting an aircraft cabin in an analogous manner.

According to a further embodiment, the method further comprises emitting visible light towards an aisle floor portion sideways of the aircraft seat from the interior aircraft light.

BRIEF DESCRIPTION OF THE FIGURES

Further exemplary embodiments of the invention will be described below with respect to the accompanying drawings, wherein.

DETAILED DESCRIPTION

Figure 1:
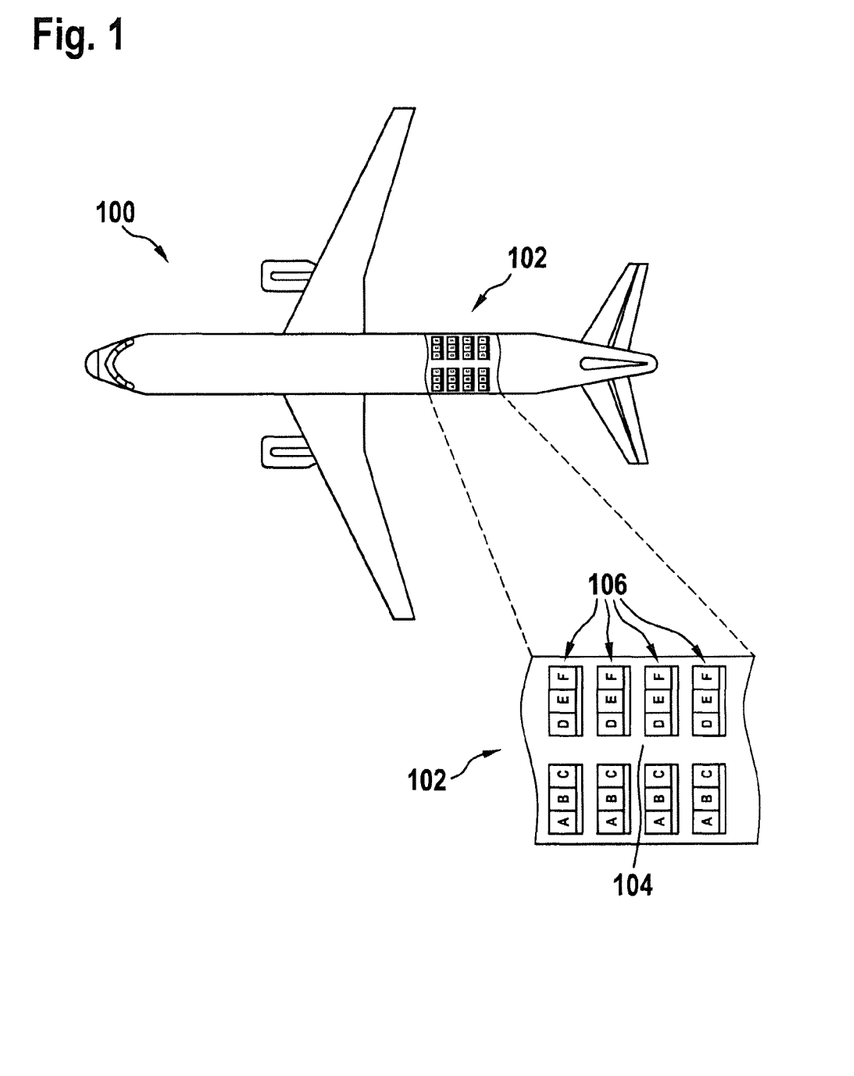
FIG. 1 shows an aircraft in accordance with an exemplary embodiment of the invention, the aircraft being shown in a top view and being shown as partially cut open for illustrating the interior of the aircraft, which is equipped with a plurality of interior aircraft lights in accordance with exemplary embodiments of the invention.

FIG. 1 shows an aircraft 100 in accordance with an exemplary embodiment of the invention. While the aircraft 100, which is a large commercial passenger airplane, is shown in a top view, a rear portion of the aircraft 100 is depicted in a cut-open manner, in order to view the interior of the aircraft 100 there.

In the cut-open portion, part of an aircraft cabin 102 is depicted. The aircraft cabin 102 comprises an aisle 104 and a plurality of seat rows 106. In the depicted portion of the aircraft cabin 102, four seat rows 106 and an according section of the aisle 104 are present. In the exemplary embodiment of FIG. 1, each of the seat rows 106 has six aircraft seats, indicated with letters A, B, C, D, E, and F, as is customary in the field of commercial aviation.

In the exemplary embodiment of FIG. 1, each of the aisle seats C and D is equipped with an interior aircraft light in accordance with an exemplary embodiment of the invention. As the interior aircraft lights are arranged below the seat pans of the aircraft seats, they are blocked from view in FIG. 1. The details of the interior aircraft lights will be discussed below.

Figure 2:
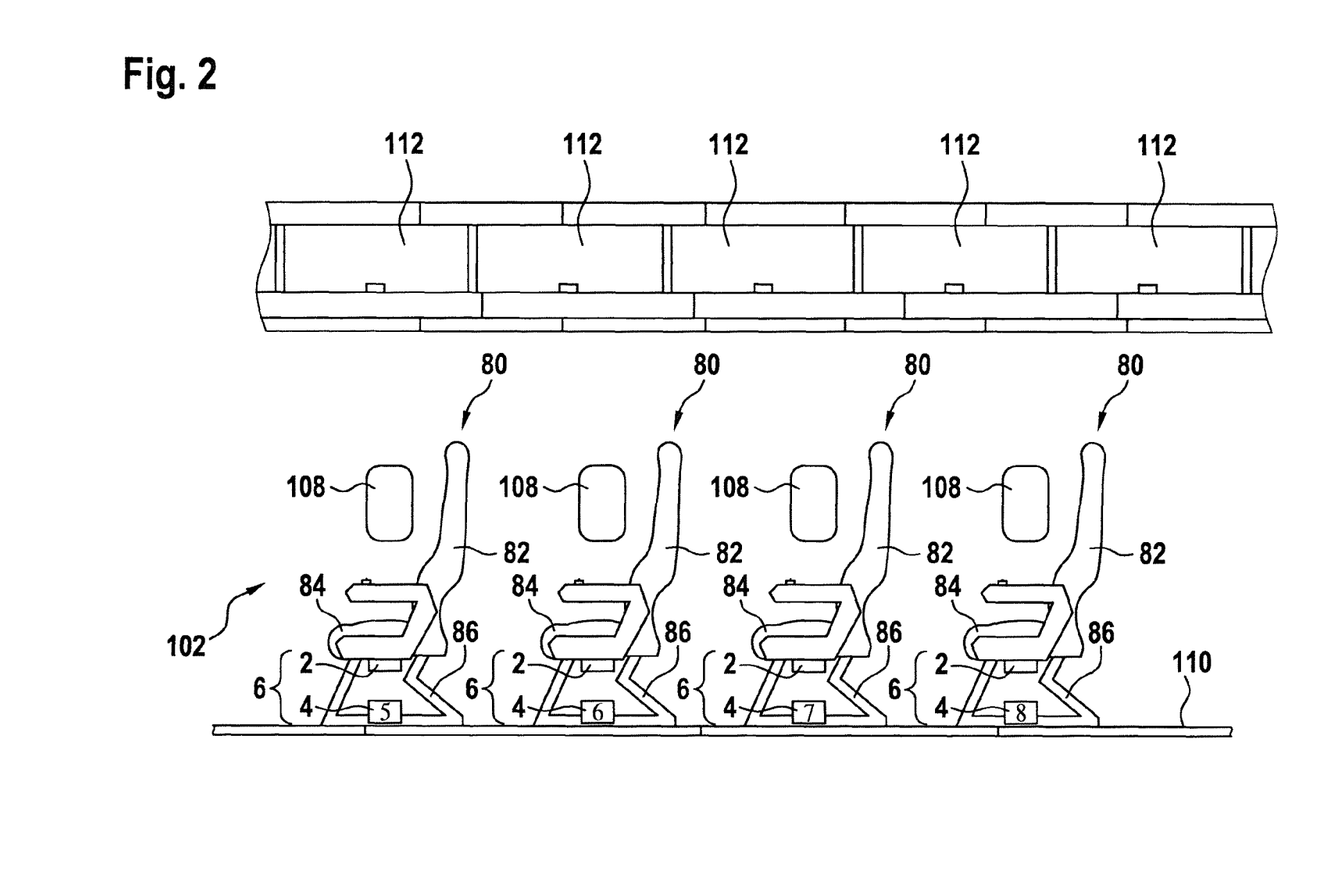
FIG. 2 shows a portion of an aircraft cabin, equipped with a plurality of aircraft cabin lighting systems in accordance with exemplary embodiments of the invention, in a side view.

FIG. 2 shows a portion of an aircraft cabin 102, equipped with a plurality of aircraft cabin lighting systems 6 in accordance with exemplary embodiments of the invention, in a side view. The aircraft cabin 102 has various structures/elements that are commonly encountered in an aircraft cabin of a large passenger air plane. For illustrative purposes, four aircraft seats 80, also referred to as passenger seats, are depicted. The aircraft seats 80 are mounted to a floor 110 of the aircraft cabin 102. Each of the depicted aircraft seats 80 belongs to a different seat row. In the framework of FIG. 1, the depicted aircraft seats 80 of FIG. 2 may be the aisle seats D. In the exemplary embodiment of FIG. 2, the four depicted aircraft seats 80 are aisle seats of seat rows "5", "6", "7", and "8" of the aircraft. For each of the seat rows, a window 108 is provided, which allows the passengers to view the outside of the aircraft. Further, a plurality of overhead baggage compartments 112 are shown, which provide storage space for the passengers.

Each of the aircraft seats 80 has a seat back 82, a seat pan 84, and a seat base 86. The seat base 86 supports the seat back 82 and the seat pan 84. Each of the aircraft seats 80 is equipped with an aircraft cabin lighting system 6 in accordance with an exemplary embodiment of the invention. Each of the aircraft cabin lighting systems 6 comprises an interior aircraft light 2 and a photoluminescent panel 4. Both the interior aircraft light 2 and the photoluminescent panel 4 are mounted to the aircraft seat 80. In the exemplary embodiment of FIG. 2, both the interior aircraft light 2 and the photoluminescent panel 4 are mounted to the seat base 86 of the aircraft seat 80. However, it is also possible that the components of the aircraft cabin lighting systems 6 are mounted to different structures. For example, the interior aircraft light 2 may be mounted to the seat pan 84. The photoluminescent panel 4 may for example be mounted to the floor 110 of the aircraft cabin 102.

In operation, the interior aircraft light 2 of each of the aircraft cabin lighting systems 6 emits UV radiation towards a portion of the floor 110 underneath the respective aircraft seat 80. In particular, the interior aircraft light 2 emits UV radiation towards the photoluminescent panel 4 of the respective aircraft seat 80. With the interior aircraft light 2 being mounted to the seat base 86 of the respective aircraft seat 80, the distance from the interior aircraft light 2 to the photoluminescent panel 4 is small and the provision of UV radiation at the photoluminescent panel 4 can be effected in a highly efficient manner.

In the exemplary embodiment of FIG. 2, the photoluminescent panel 4 of each of the aircraft cabin lighting systems 6 has a row number shape. In other words, the photoluminescent panel 4 of each of the aircraft cabin lighting systems 6 is in the form of a row number. In yet other words, the photoluminescent panel 4 has a light emission surface in the form of a row number, with light emission from the light emission surface taking place after the photoluminescent panel 4 has been excited with UV radiation by the respective interior aircraft light 2. While the photoluminescent panels 4 of the exemplary embodiment of FIG. 2 are described as having row number shapes, because the light emission surfaces are in the form of row numbers, the overall extension of the photoluminescent panel 4 may have another shape. In the exemplary embodiment of FIG. 2, the photoluminescent panels 4 have a basic rectangular shape, with the row numbers forming part of the basic rectangular shape. Under daylight conditions, the light emission surface is perceived as part of a larger, rectangular structure.

In the exemplary embodiment of FIG. 2, the photoluminescent panel 4 is mounted to a lower portion of the seat base 86. In particular, the photoluminescent panel 4 is mounted to a lower cross bar of the seat base 86 that is positioned at or in close proximity to the floor 110 of the aircraft cabin 102. The photoluminescent panel 4 may be snapped on to said lower cross bar.

In the exemplary embodiment of FIG. 2, the photoluminescent panel 4 is inclined with respect to the floor 110 of the aircraft cabin 102. In particular, the photoluminescent panel 4 is inclined towards the observer, i.e. to the passenger standing or walking in the aisle of the aircraft cabin 102. In other words, the upper region of the photoluminescent panel 4 is farther removed from the aisle than the lower region of the photoluminescent panel 4.

The depicted four exemplary photoluminescent panels 4 have the shapes of the row numbers "5", "6", "7", and "8". It is understood that the photoluminescent panels may also be in the form of other row numbers, depending on which row they are associated with. Further, it is understood that the photoluminescent panels may have shapes other than numbers, such as more extensive surfaces for general illumination, patterns for patterned illumination, strip-like shapes for guidance along the aisle of the aircraft cabin 102 during night-time flights and/or during emergencies, etc. The photoluminescent panels may be mounted to the seat base 86 or to the floor 110 of the aircraft cabin 102 or to other structures that may be present in the vicinity of the floor 110 of the aircraft cabin 102.

Figure 3:
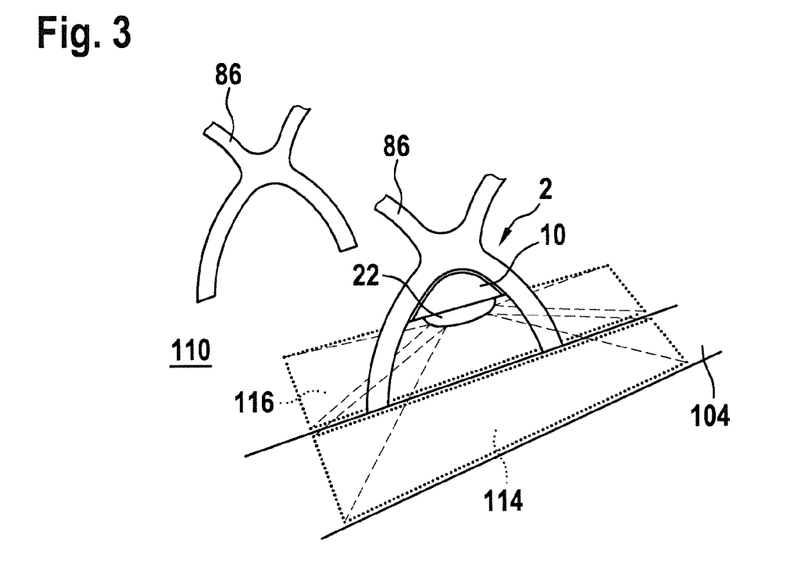
FIG. 3 shows an interior aircraft light in accordance with an exemplary embodiment of the invention, mounted to a seat base of an aircraft seat, in a per spective view.

FIG. 3 shows an interior aircraft light 2 in accordance with an exemplary embodiment of the invention, mounted to a seat base 86 of an aircraft seat, in a perspective view. In particular, FIG. 3 depicts the seat base 86 and the interior aircraft light 2 in a perspective downwards view, also showing a portion of the floor 110 of the aircraft cabin, including a portion of an aisle 104 of the aircraft cabin and a portion of the floor 110 around the aircraft seat in question. In the exemplary embodiment of FIG. 3, the seat base 86 comprises two X-shaped support structures, each having two crossing legs.

The interior aircraft light 2 is mounted to one of the X-shaped support structures of the seat base 86. The interior aircraft light 2 has a mounting structure 10 for mounting the interior aircraft light 2 to the seat base 86. The mounting structure 10 has a shape that is complementary to the seat base 86. In the exemplary embodiment of FIG. 3, the mounting structure 10 is shaped to fit into the space between the two legs of the X-shaped support structure of the seat base 86 below the intersection of the two legs.

The mounting structure 10 supports various components of the interior aircraft light 2. In particular, the mounting structure 10 supports a UV radiation source, a first optical system, associated with the UV radiation source, a visible light source, a second optical system, associated with the visible light source, and a transparent protective cover 22. In the viewing direction of FIG. 3, the UV radiation source, the first optical system, the visible light source, and the second optical system are arranged behind the transparent protective cover 22 and are not shown in FIG. 3. Exemplary embodiments of these components will be described below with respect to FIG. 6.

In operation, the interior aircraft light 2 emits UV radiation towards a floor portion 116 underneath the aircraft seat. In operation, the interior aircraft light 2 further emits visible light towards an aisle floor portion 114 sideways of the aircraft seat. Both the floor portion 116 underneath the aircraft seat and the aisle floor portion 114 sideways of the aircraft seat are indicated with dotted lines in FIG. 3, and the respective illumination cones towards these floor portions are indicated with dashed lines in FIG. 3.

The aisle floor portion 114 sideways of the aircraft seat extends substantially across the entire width of the aisle 104 and along a length of the aisle 104 that substantially corresponds to a lengthwise extension of one seat row. By equipping the aisle seats of subsequent seat rows with such interior aircraft lights 2, a substantially continuous illumination of the floor of the aisle 104 may be achieved.

The floor portion 116 underneath the aircraft seat extends along a length that substantially corresponds to the lengthwise extension of one seat row and extends across a width that corresponds to about one third of a widthwise extension of an aircraft seat. In this way, a rather narrow strip of the floor 110 underneath the aircraft seat is provided with UV radiation. Within the illumination cone towards the floor portion 116, photoluminescent panels, as described above, may be provided for emitting visible light after being excited by the UV radiation from the interior aircraft light 2. All of above described kinds of photoluminescent panels may be provided in the illumination cone. They may be provided at the floor 110 of the aircraft cabin or somewhere in between the interior aircraft light 2 and the floor portion 116 underneath the aircraft seat.

Figure 4:
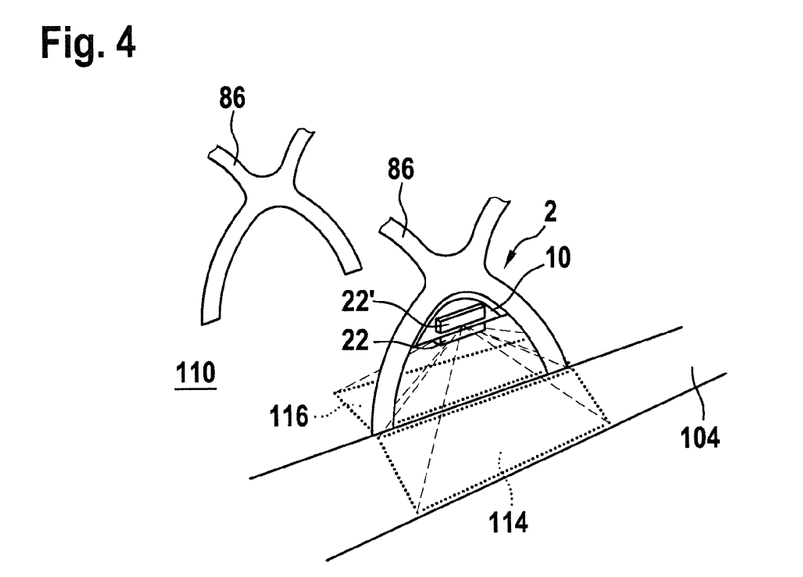
FIG. 4 shows an interior aircraft light in accordance with another exemplary embodiment of the invention, mounted to a seat base of an aircraft seat, in a perspective view.

FIG. 4 shows an interior aircraft light 2 in accordance with another exemplary embodiment of the invention, mounted to a seat base 86 of an aircraft seat, in a perspective view. The interior aircraft light 2 of FIG. 4 is similar to the interior aircraft light 2 of FIG. 3. The mounting structure 10 of the interior aircraft light 2 of FIG. 4 corresponds to the mounting structure 10 of the interior aircraft light 2 of FIG. 3. Also, the interior aircraft light 2 of FIG. 4 in operation emits UV radiation towards a floor portion 116 underneath the aircraft seat and emits visible light towards an aisle floor portion 114 sideways of the aircraft seat.

In the exemplary embodiment of FIG. 4, the floor portion 116 underneath the aircraft seat and the aisle floor portion 114 have a somewhat smaller length-wise extension than the corresponding floor portions in the exemplary embodiment of FIG. 3. However, the concept of providing visible light to the aisle floor portion 114 sideways of the aircraft seat and providing UV radiation to the floor portion 116 underneath the aircraft seat corresponds to the FIG. 3 embodiment.

As compared to the interior aircraft light 2 of FIG. 3, where the light sources and optical systems are arranged between the mounting structure 10 and a single transparent protective cover 22, the interior aircraft light 2 of FIG. 4 has a first transparent protective cover 22, arranged over a UV radiation source and a first optical system, and a second transparent protective cover 22', arranged over a visible light source and a second optical system. In this way, the emission of UV radiation and the emission of visible light may be provided in an inheritably more targeted manner towards the desired floor portions. However, the separation of the components associated with the emission of UV radiation and the components associated with the emission of visible light comes at the expense of providing two transparent protective covers 22, 22'.

Figure 5:
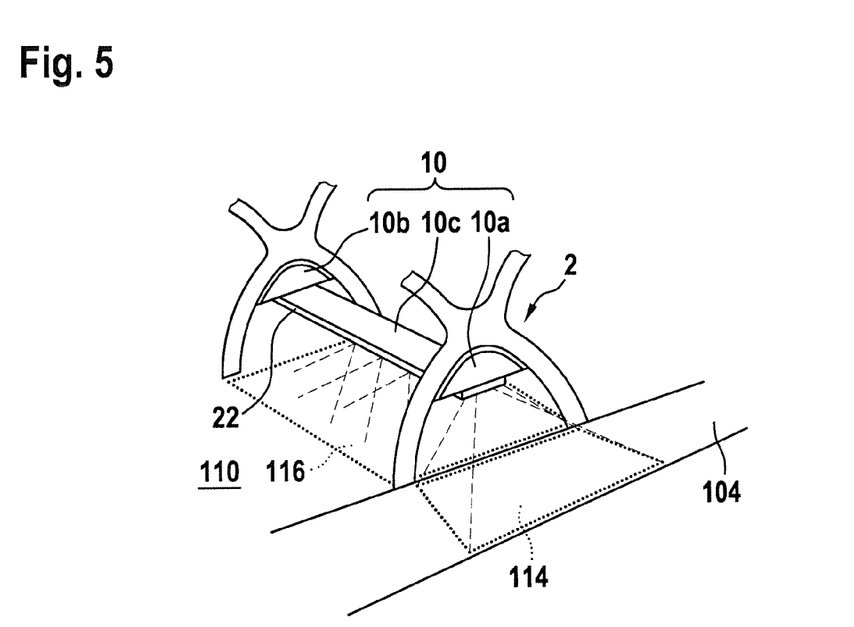
FIG. 5 shows an interior aircraft light in accordance with yet another exemplary embodiment of the invention, mounted to a seat base of an aircraft seat, in a perspective view.

FIG. 5 shows an interior aircraft light 2 in accordance with yet another exemplary embodiment of the invention, mounted to a seat base 86 of an aircraft seat, in a perspective view. The interior aircraft light 2 of FIG. 5 also emits UV radiation towards a floor portion 116 underneath the aircraft seat and emits visible light towards an aisle floor portion 114 sideways of the aircraft seat.

The mounting structure 10 of the interior aircraft light 2 of FIG. 5 comprises a first seat base mounting part 10a, a second seat base mounting part 10b, and a cross mounting part 10c. The first seat base mounting part 10a and the second seat base mounting part 10b are substantially shaped as the mounting structure 10 of the interior aircraft light 2 of FIGS. 3 and 4. The first seat base mounting part 10a and the second seat base mounting part 10b are mounted to separate X-shaped support structures of the seat base 86. The cross mounting part 10c is connected between the first seat base mounting part 10a and the second seat base mounting part 10b. It is oriented substantially parallel with the floor 110 of the aircraft cabin. The cross mounting part 10c provides an extended structure for supporting the further components of the interior aircraft light 2.

In the exemplary embodiment of FIG. 5, the cross mounting part 10c supports three UV radiation sources and three first optical systems for directing UV radiation from the three UV radiation sources towards the floor portion 116 underneath the aircraft seat. This is illustrated by three illumination cones in the viewing direction of FIG. 5. The cross mounting part 10c further supports a visible light source and a second optical system for directing visible light from the visible light source towards the aisle floor portion 114. All of those light sources and optical systems are arranged between the cross mounting part 10c and a transparent protective cover 22, extending along the cross mounting part 10c between the two X-shaped support structures of the seat base 86.

Figure 6:
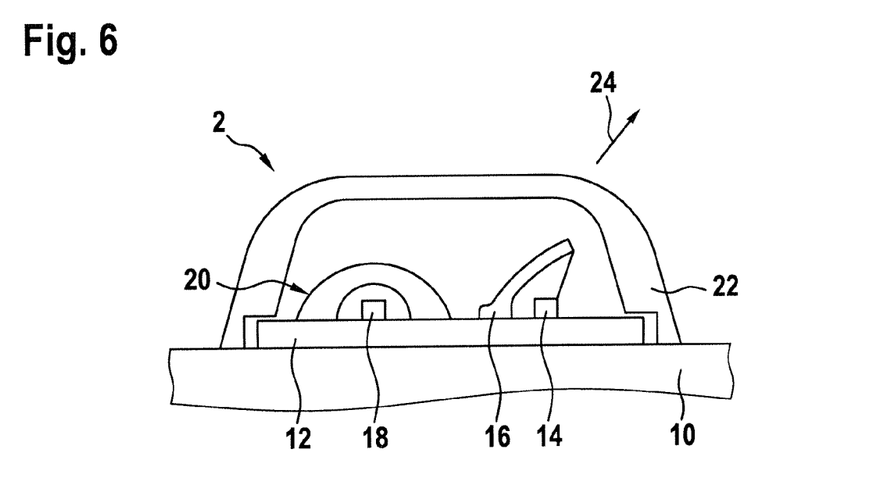
FIG. 6 shows an interior aircraft light in accordance with an exemplary embodiment of the invention in a schematic cross-sectional view.

FIG. 6 shows an interior aircraft light 2 in accordance with an exemplary embodiment of the invention in a schematic cross-sectional view. The interior aircraft light 2 has a mounting structure 10 for supporting various components as described below. The interior aircraft light 2 comprises a circuit board 12, such as a printed circuit board, and a transparent protective cover 22, with the circuit board 12 and the transparent protective cover 22 being supported directly by the mounting structure 10.

A UV radiation source 14 and a first optical light system in the form of a reflector 16 are arranged on the circuit board 12. In operation, the UV radiation source 14 emits UV radiation, and the reflector 16 directs the UV radiation towards a floor portion underneath the aircraft seat.

Also, a visible light source 18 and a second optical system in the form of a lens 20 are arranged on the circuit board 12. In operation, the visible light source 18 emits visible light, and the lens 20 directs the visible light towards an aisle floor portion sideways of the aircraft seat.

The UV radiation source 14, the reflector 16, the visible light source 18, and the lens 20 are supported by the mounting structure 10 via the circuit board 12 and are arranged between the circuit board 12 and the transparent protective cover 22.

The reflector 16 provides for a very targeted provision of UV radiation at a particular floor portion underneath the aircraft seat, such as at a floor portion underneath the aircraft seat equipped with a photoluminescent panel in the form of a row number. The lens 20 provides for a comparably wider provision of visible light towards the aisle floor portion sideways of the aircraft seat.

The interior aircraft light 2 may be oriented obliquely with respect to the floor of the aircraft cabin or with respect to a vertical plane in the aircraft cabin. In particular, the interior aircraft light 2 may be oriented in such a way that the arrow 24 of FIG. 6 points downwards in the aircraft cabin frame of reference.

In the exemplary embodiment of FIG. 6, the UV radiation source 14 emits near ultraviolet light in operation. Further, in the exemplary embodiment of FIG. 6, the visible light source 18 emits amber light or orange light or red light in operation.

It is pointed out that all of the interior aircraft lights 2 of FIGS. 3-6 may be provided with a UV radiation source and an optical system for directing UV radiation from the UV radiation source only. In other words, it is possible that the interior aircraft lights 2 do not have a visible light source and a second optical system.

Figure 7:
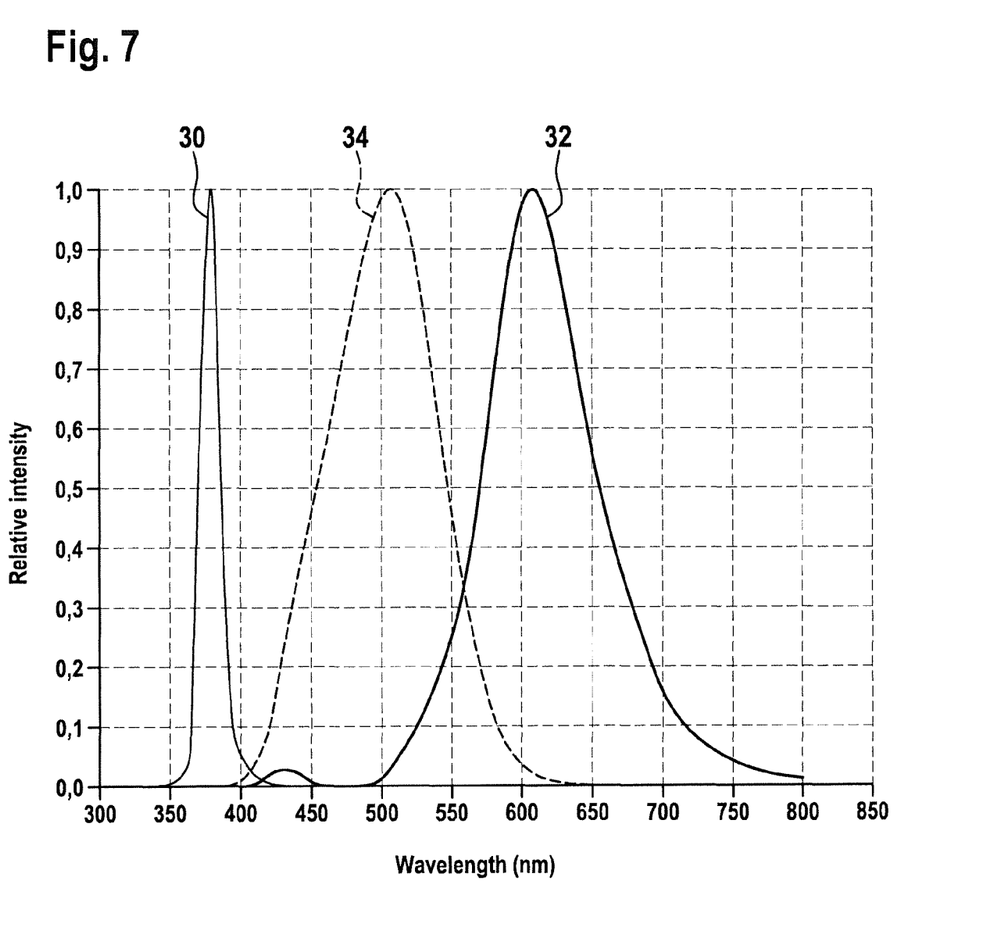
FIG. 7 shows spectral characteristics of exemplary UV and visible light sources, as may be employed in interior aircraft lights in accordance with exemplary embodiments of the invention.

FIG. 7 shows spectral characteristics of exemplary UV and visible light sources, as may be employed in interior aircraft lights in accordance with exemplary embodiments of the invention. The spectral characteristics are shown as relative intensities over the wavelength spectrum in nm.

The UV radiation source may have spectral emission characteristics as indicated by curve 30. The UV radiation source may have its peak light intensity at a peak wavelength of about 380 nm.

The visible light source may have spectral emission characteristics as indicated by curve 32. The visible light source may have its peak light intensity at a peak wavelength of about 610 nm. The visible light source may be an orange light source. The visible light source may also be an amber light source or a red light source.

The human eye's sensitivity under scotopic conditions is indicated by curve 34 in FIG. 7. It can be seen that the human eye is not very sensitive to the visible light emitted in accordance with the spectral emission characteristics of curve 32. Also, the human eye is almost entirely insensitive to the spectral emission characteristics of the UV radiation source, as indicated by curve 30. In this way, the given UV and visible light sources are very little intrusive to passengers that may be exposed to them or to stray light from these light sources. Passengers sleeping in the aircraft seats are not or only little disturbed by the UV and visible light sources.

The photoluminescent panels of the aircraft cabin lighting systems, as described herein, may provide light emission with wavelengths between 450 nm and 550 nm. With the human eye being highly sensitive to this wavelength range in scotopic conditions, the photoluminescent panels may provide for a highly effective guiding and/or illumination. However, with this guiding/illumination being limited to locations underneath the aircraft seat, passengers sleeping in the aircraft seats are also not or only little disturbed by the light emission from the photoluminescent panels.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft seat, comprising: a seat back; a seat pan; a seat base that supports the seat back and the seat pan; and an interior aircraft light, attached to the seat base, wherein the interior aircraft light comprises: an ultraviolet (UV) radiation source; a visible light source; a first optical system that directs UV radiation from the UV radiation source towards a floor portion underneath the aircraft seat; and a second optical system that directs visible light from the visible light source towards an aisle floor portion sideways of the aircraft seat.

2. The aircraft seat according to claim 1, wherein the UV radiation source of the interior aircraft light is a UV LED.

3. The aircraft seat according to claim 1, wherein the first optical system of the interior aircraft light comprises a reflector arranged over the UV radiation source for directing UV radiation from the UV radiation source towards the floor portion underneath the aircraft seat.

4. The aircraft seat according to claim 1, wherein the interior aircraft light further comprises a transparent or translucent protective cover, arranged over the UV radiation source and the optical system.

5. The aircraft seat according to claim 1, wherein a mounting structure of the interior aircraft light is provided for mounting the interior aircraft light to the seat base of the aircraft seat, with the mounting structure in particular being shaped complementary to the seat base of the aircraft seat.

6. The aircraft seat according to claim 1, wherein the visible light source of the interior aircraft light is in the amber orange red range of the color spectrum, with the visible light source in particular having its peak light intensity at a peak wavelength of between 580 nm and 650 nm.

7. The aircraft seat according to claim 6, wherein the visible light source of the interior aircraft light is in the amber orange red range of the color spectrum, with the visible light source in particular having its peak light intensity at a peak wavelength of between 590 nm and 630 nm.

8. The aircraft seat according to claim 1, wherein the visible light source and the second optical system of the interior aircraft light that provides an illumination of the aisle floor portion sideways of the aircraft seat with a ratio of maximum illuminance to minimum illuminance of between 1 and 3.

9. The aircraft seat according to claim 8, wherein the visible light source and the second optical system of the interior aircraft light that provides an illumination of the aisle floor portion sideways of the aircraft seat with a ratio of maximum illuminance to minimum illuminance of between 1.5 and 2.5.

10. An aircraft cabin lighting system, comprising: an aircraft seat, comprising a seat back, a seat pan, and a seat base that supports the seat back and the seat pan; an interior aircraft light attached to the seat base; wherein the interior aircraft light comprises: an ultraviolet (UV) radiation source; a visible light source; a first optical system that directs UV radiation from the UV radiation source towards a floor portion underneath the aircraft seat; and a second optical system that directs visible light from the visible light source towards an aisle floor portion sideways of the aircraft seat; and a photoluminescent panel, with the photoluminescent panel in operation emitting visible light after being excited by the UV radiation source of the interior aircraft light.

11. An aircraft cabin lighting system according to claim 10, wherein the photoluminescent panel has a row number shape.

12. An aircraft cabin lighting system according to claim 10, wherein the photoluminescent panel is attached to a seat base of the aircraft seat.

* * * * *